United States Patent
Stehle et al.

[11] 3,945,245
[45] Mar. 23, 1976

[54] METHOD AND EQUIPMENT FOR DETECTING DEFLECTIVE NUCLEAR FUEL RODS

[75] Inventors: Heinz Stehle, Marloffstein; Helmut Assmann, Erlangen; Peter Wahode, Nurnberg; Walter Janson, Erlangen, all of Germany

[73] Assignee: Siemens Aktiengesellschaft, Munich, Germany

[22] Filed: Mar. 18, 1974

[21] Appl. No.: 452,254

[30] Foreign Application Priority Data
Mar. 23, 1973 Germany............................. 2314650

[52] U.S. Cl.................... 73/71.4; 73/15 R; 73/40; 73/40.5 A; 73/71.5 US; 176/19 LD
[51] Int. Cl.².................... G01N 29/00; G01M 3/04
[58] Field of Search............... 73/71.4, 67.5 R, 67.6, 73/67.7, 67.8 R, 67.8 S, 71.5 US, 15 R, 17 A, 15.4, 73, 75, 40, 40.5 A; 176/19 R, 19 LD, 80

[56] References Cited
UNITED STATES PATENTS

| | | | |
|---|---|---|---|
| 2,718,141 | 9/1955 | Richards................................. | 73/75 |
| 2,979,950 | 4/1961 | Leone................................. | 73/17 A X |
| 3,292,426 | 12/1966 | McCann................................. | 73/71.4 |
| 3,459,925 | 8/1969 | Goosey et al.................. | 176/19 R X |
| 3,546,924 | 12/1970 | Nussbaum et al................... | 73/67.7 |
| 3,592,967 | 7/1971 | Harris................................. | 73/71.4 X |
| 3,597,316 | 8/1971 | Lynworth........................... | 176/19 R |
| 3,666,625 | 5/1972 | Nybo........................... | 176/19 LD X |
| 3,813,286 | 5/1974 | Goldman et al.................. | 176/19 R |
| 3,823,068 | 7/1974 | Worlton et al................. | 176/19 LD |

FOREIGN PATENTS OR APPLICATIONS

| | | | |
|---|---|---|---|
| 914,380 | 1/1963 | United Kingdom................... | 176/80 |

*Primary Examiner*—Richard C. Queisser
*Assistant Examiner*—Stephen A. Kreitman
*Attorney, Agent, or Firm*—Kenyon & Kenyon Reilly Carr & Chapin

[57] ABSTRACT

Nuclear fuel rod ends of water-cooled reactor fuel rods, are heated in the region of the fission gas plenums and/or in the region of the upper or lower ends of the fuel columns. The moisture present in the case of damage to the fuel rods' casings, evaporates and is partly condensed at the end caps. In the case of a fuel rod completely filled with water, steam bubbles are generated. Both indications of casing leakage or damage are ascertained by ultrasonic reflection measurements and/or measurement of a temperature-vs-time curve, obtained at the end cap.

8 Claims, 7 Drawing Figures

METHOD AND EQUIPMENT FOR DETECTING DEFLECTIVE NUCLEAR FUEL RODS

BACKGROUND OF THE INVENTION

The present invention concerns a method for detecting defective fuel rods in a formation of complete fuel assemblies of water-cooled nuclear reactors.

Nuclear reactor fuel rods are the smallest unit in the construction of a reactor core; they contain the nuclear fuel, usually in the form of pellets, and give off the nuclear fission heat generated in them to the surrounding cooling water. It is here of the greatest importance that as far as possible, no radioactive fuel substances pass into the cooling water. This is achieved principally by a design of the fuel rods such that a cladding tube or casing with end caps welded-on gas-tight, surrounds the nuclear fuel and shields the latter as well as the fission products generated in it from direct contact with the cooling water.

During extended operation of the reactor, it can, however, not be completely precluded that isolated fuel rods develop leaks, so that cooling water can enter and possibly also radioactive material can escape. The cooling water purification systems provided in every nuclear plant, are laid out so that they can remove a certain amount of radioactive material from the cooling water circulation. If however, the radioactivity becomes so high that these systems are overloaded, there is no other recourse than to examine the core for defective fuel assemblies or fuel rods during shutdown periods.

This examination can first be performed purely visually by inspecting the fuel assemblies removed from the reactor core, usually under water by means of an underwater television camera. By this method, mainly highly defective fuel rods can be found, particularly such which are located in the outer rows of the fuel assemblies. However, it is very difficult to visually inspect fuel rods by this approach, which are located in the interior of a fuel assembly. To this must be added that it is also important to identify such nuclear fuel rods as defective which have only minor leaks, which cannot be detected externally by purely visual inspection.

In this connection, it has already been proposed to provide fuel rods in the interior with auxiliary devices which change upon the entry of water in such a manner that the change can be ascertained from the outside, e.g., magnetically. Such devices, however, increase the manufacturing costs of the fuel rods and can, of course, have sources of trouble of their own.

The problem therefore arose to find a method by which it is possible to ascertain the entry of water in defective fuel rods which have no special internals for this purpose. In this connection, it is particularly important that such an examination can be performed on the completed fuel assembly. The technical means required for disassembling and re-assembling irradiated fuel assemblies would be very great. In completely disassembling and re-assembling a fuel assembly, the great danger exists furthermore that individual fuel rods and the support structure (spacers) might get damaged. It should also be possible to carry out such examinations within the time available for fuel changing. For economic reasons this time must be kept as short as possible.

SUMMARY OF THE INVENTION

According to the invention, the solution to this problem is that the cladding tubes of the fuel rods are heated in the vicinity of an accessible end cap, whereby any water present in the interior of defective fuel rods is heated up, and that the formation of steam bubbles or condensate is determined by means of the ultrasonic pulse echo method at the rods' end caps. This method is preferably carried out in the fuel pit, which is arranged beside the reactor pit containing the reactor vessel. During fuel changing, both pit spaces are filled with water and connected with each other under water by a lock for the transport of fuel assemblies. Also the examination of these fuel assemblies for defective fuel rods takes place under water. The water serves here as a radiation shield and for removing the decay heat from the fuel rods. For the testing process the fuel rods' ends must be accessible for the test equipment. Depending on the design of the fuel assemblies, this means that the fuel assembly head or base must be removed. The position best suited for carrying out the test procedure depends on the given design of the fuel assembly in each case.

In addition to the use of the pulse echo method, other ways to determine the presence of water in the fuel rods may be used. A fuel rod has a normally empty fission gas plenum or space above the fuel in its cladding tube or casing. Heating of the content of this space when containing moisture or water, produces a different thermal response than is produced if the space is free from moisture or water, and this response may be externally detected. If the thermal response is the formation of vapor which condenses on colder parts of the casing and falls as water drops, the pulse echo signal is disturbed; the signal is not disturbed in the absence of the water drops forming the thermal response; but also, the time rate of temperature rise in the casing is different for the space when it contains moisture or water, than when the space is free from moisture, so a time-vs-temperature curve can provide readout of the thermal response. Further, the power required for a heat input or output to hold the space temperature constant at a point removed from the heat input or output source, also permits external detection of the thermal response due to the absence or presence of moisture or water.

BRIEF DESCRIPTION OF THE DRAWINGS

The presently preferred mode for carrying out the invention is illustrated schematically by the accompanying drawings, in which.

DETAILED DESCRIPTION OF THE INVENTION

Figure 1:
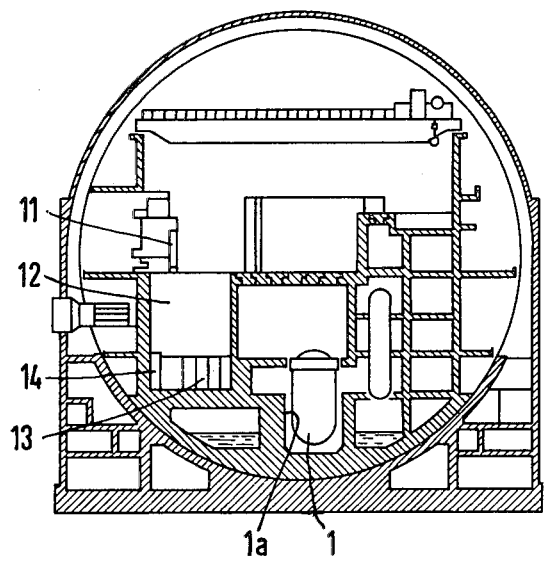
FIG. 1 is a vertical section of a currently common pressurized-water reactor building.

FIG. 1 shows schematically a longitudinal or vertical section through a circular reactor building such as is common for pressurized-water reactors. The fuel assemblies are located in the pressure vessel 1. Above the reactor pit $a$, the charging machine 11, or refueling machine, is arranged, as shown, to run over the fuel pit 12, from the reactor pit, and to there set down fuel assemblies in vertical positions, taken from the opened pressure vessel. For this purpose a storage rack 13 for vertically holding the fuel assemblies, is provided, the design of which is made so that the fuel assemblies set down there vertically in their entirety cannot become critical. To the side of the storage pit the test station 14 is located, in which the fuel assemblies to be tested are placed. The fuel assemblies are always under water in the pit and in the test station. By means of the charging machine 11 and a remote-controlled auxiliary equipment, not shown, the test equipment of this invention can then be placed on the accessible ends of the individual fuel rods within each fuel assembly formation while under the water.

Figure 2:
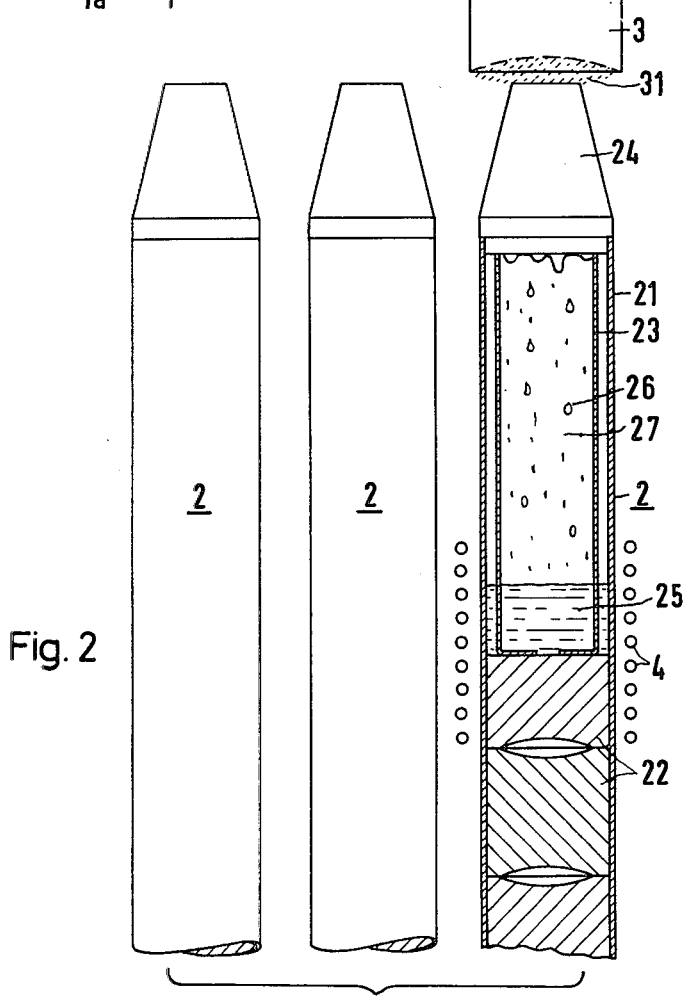
FIG. 2 shows three adjacent fuel rods which are part of a fuel assembly, one rod being in vertical section and illustrating the fundamentals of the invention.

FIG. 2 shows, as a section of a fuel assembly, three adjacent fuel rods 2, one of which is shown in a longitudinal cross section. It will be seen that the fuel rod consists of a cladding tube 21, the weld-sealed end cap 24 and the nuclear fuel pellets 22. Below the end cap 24, there is in this example a support sleeve 23, which has its purpose to increase the strength of the cladding tube in the empty fission gas plenum above the pellets 22, against the pressure of the reactor coolant. This component, however, is not of special importance for the operation of the method according to the invention.

Figure 3:
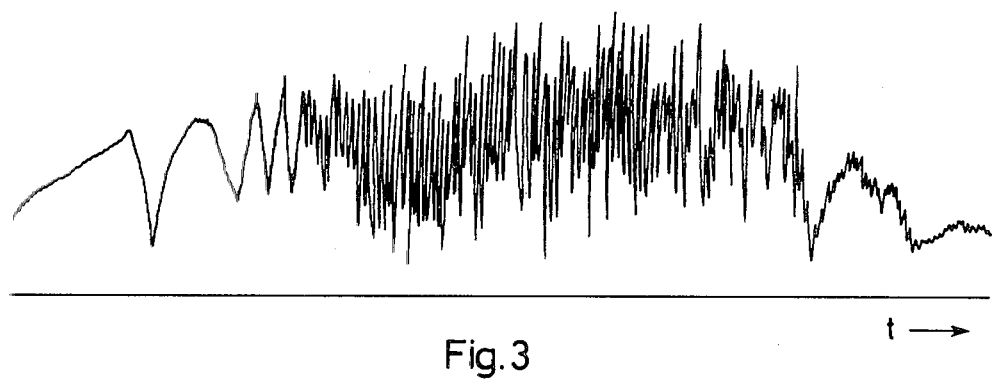
FIG. 3 shows an oscilloscope picture obtained by ultrasonic testing of a heated fuel rod end.

Let us assume that this fuel rod, shown in cross section, is defective. For testing the fuel rod, a tube-like heater element, e.g., a high-frequency induction coil 4, is pushed over the end of the fuel rod and the fuel rod is thereby locally heated under the protective water. Steam 27 develops thereby in the space below the end cap 24 and condenses there, as the temperature is lower there due to the cooling of the surrounding water. The steam condensed there will fall down in the form of drops 26 and evaporate again through the high-frequency heating. To ascertain this condition, an ultrasonic head 3, known per se, is placed on the end cap 24 via a coupling medium 31, e.g., water, plastic, rubber or grease, and supersonic pulses are introduced by radiation in the axial direction of the fuel rod. Here, the echo from the back of the end cap, i.e., from the side facing the interior of the fuel rod, is disturbed by the formation of the water drops, so that an accordingly disturbed echo signal is formed. This is recorded by an oscilloscope and, in the case of a defective tube, yields a disturbed picture such as is reproduced in FIG. 3. A further improvement of this method can be achieved by additionally cooling the end cap, for instance, by means of a Peltier element. Such cooling aids the condensation of the steam at the end cap and thereby enhances the formation of drops.

If the fission gas space is completely filled with water, the rear-wall echo is likewise disturbed by rising steam bubbles.

Figure 6:
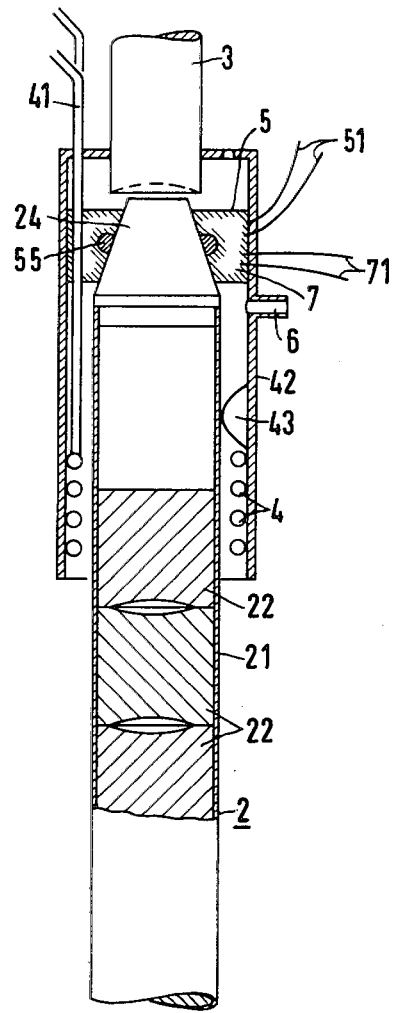
FIG. 6, in vertical section, shows another example of the new equipment.

For the implementation of the method, it is advantageous to combine the ultrasonic equipment 3 and the heating element 4 to form an integrated structural unit, as shown in FIG. 6, which will be discussed later.

Figure 4:
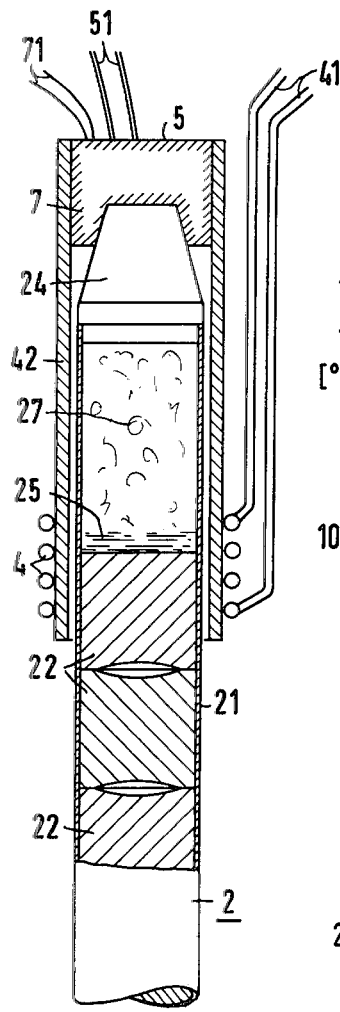
FIG. 4 shows in vertical section, an example of the equipment of the invention.

A further variant of the testing method according to the invention is shown in FIG. 4. Here, the end of the fuel rod is likewise heated by a predetermined heating power (e.g., 300 W). Due to the relatively large heat of evaporation of water, a delay occurs at the boiling point for the remainder of the temperature rise. The measurement of the temperature-vs-time curve at this end cap is therefore a measure for the presence of water in the interior of the fuel rod.

Figure 5:
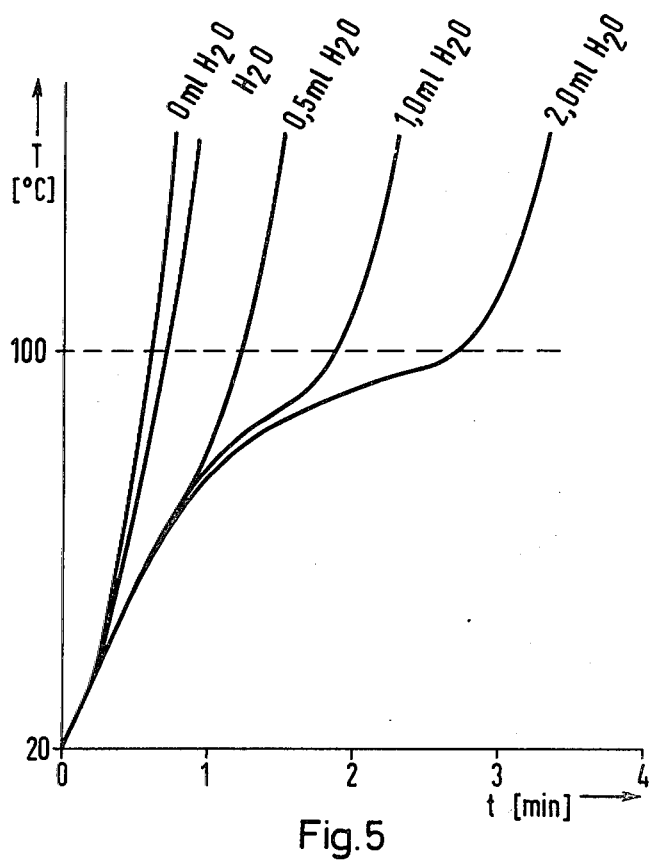
FIG. 5 is a graph showing temperature-vs-time curves.

In FIG. 5, the values obtained on a model fuel rod are shown schematically. On the ordinate, the temperatures at the end cap 24 are plotted. On the abscissa is plotted the time in minutes. With constant heating power the curves shown for the different water contents are obtained. It will be seen therefrom that even with traces of water, somewhat more time is required to reach the 100°C limit at the end cap than with a fuel rod which is completely free of water. The more water present in the fuel rod, the more will the temperature rise be delayed, as a greater or smaller amount of energy is consumed for heating the water up to its boiling temperature and its evaporation.

The heating element 4 and the temperature measuring device 5 are combined together in this example (FIG. 4) via a tubular structure 42 to form a rigid testing unit. In addition to handling arrangements, not shown, the unit must be connected via lines 41 with the electric energy source and via the lines 51 with the temperature recording equipment. The tubular structure 42 is advantageously designed here as a heat insulator, so that the surrounding water, due to its cooling effect, does not influence the resulting indication detrimentally. If this structure is applied under water, an air volume will also remain in its interior, which extends up to the vicinity of the heating element 4 when placed on the end of the fuel rod. In principle, different heating methods can, of course, be used. For practical reasons, induction heating is preferred, as the heat is generated in the work piece, i.e., in this case in the cladding tube of the fuel rod itself. As this cladding tube in turn has a very thin wall, its wall thickness being in the order of between 0.5 and 2 mm, the frequency of the induction current used should be in the high-frequency range, i.e., at about 100 kHz and higher. With such frequencies, the number of turns of the inductor 4 can also be kept smaller than with lower frequencies, which is a definite advantage here, as the entire test fixture must always be pushed over a fuel rod and the distances between adjacent fuel rods in a fuel rod assembly are only a few mm.

Conversely, it would, of course, also be possible to measure the amount of heat transferred itself, instead of the temperature curve at the end cap. This can be accomplished, on the one hand by combining with the temperature sensor 5 a Peltier element 7 with its electrical connections 71, whose output can be controlled so that a constant temperature adjusts itself at the end cap 24. From the power consumed by the Peltier element, conclusions can then be drawn as to the presence of water, and also its quantity, in the fuel rod. On the other hand, with intermittent operation of the heating element, the number of heating pulses required to reach a given end cap temperature can be counted automatically.

FIG. 6 shows a further embodiment of the equipment for carrying out the method according to the invention. Here, the induction coil 4 is arranged within the tubular structure 42, and also the high-frequency leads 41 are brought out upward within this structure. In this case it is advantageous to attach shoes 43 for centering, so that uniform heating of the cladding tube 21 within the inductor 4 is thereby ensured. Again, the ultrasonic measuring head 3 as well as the cooling device 7 or the temperature measuring device 5, respectively, are combined here in one structural unit. To improve the thermal insulation between the structure 42 and the fuel rod cladding tube 21, air can be blown in via the connection 6 in this example, which displaces the water completely from the space between the inductor 4 and the fuel rod. The advantage obtained thereby benefits each of the measuring methods indicated. An O-ring seal 55 takes care that the space around the ultrasonic measuring head 3 remains filled with water as the coupling medium.

Figure 7:
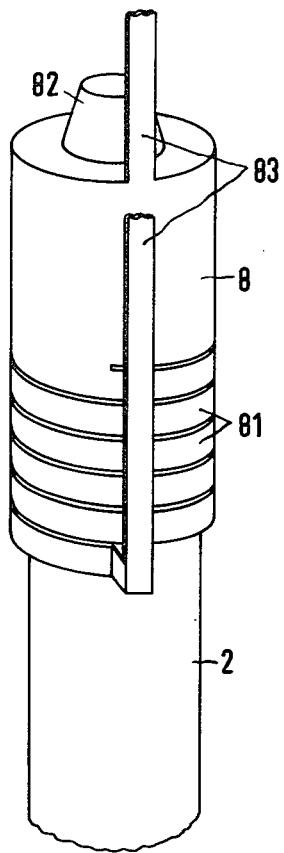
FIG. 7 is a perspective view of a further example.

As already mentioned, the distance between the individual fuel rods in the formation of the fuel assembly is very small. A design for the heating element must therefore be found which takes as little space as possible. Such a possibility is shown for the case of induction heating in FIG. 7. Here, the induction coil 81 is machined out by helical slotting of the lower end of the tubular structure 8. As in the other examples, electrical insulation between the individual inductor parts, for instance, by means of a plastic coating, is advantageous here, of course. The inductor lead 83 is in ribbon form and is brought out at the top. In view of the relatively low high-frequency power, separate cooling of the inductor can in some cases be dispensed with, and sufficient heat transfer to the surrounding pit water is possible via the insulation. The extension 82 of the tubular structure is fitted in this example to the shape of the end cap of the fuel rod system in question. As described in the preceding example, the temperature measuring device as well as the cooling device can additionally be accommodated in the interior. The ultrasonic measuring head also can be combined structurally with this device.

To further reduce the testing time, which is required also with this method, it is advantageous to arrange the devices depicted in the figures by way of example side-by-side parallel to each other and to thereby scan a large part of the fuel rods of a fuel assembly simultaneously for the entry of water. In this case, a relative comparison of the measured values to be interrogated sequentially may be sufficient to detect a defective fuel rod immediately. The heating of the moisture that may have entered, which is carried out in the method according to the invention via heating the cladding tube, can be achieved in specially situated cases via the decay heat of the fuel pellets located in the vicinity of the end cap. In this case it is necessary to carry out good thermal insulation of the upper portion of the fuel rod, as already mentioned in connection with the different examples of embodiments.

In the foregoing, reference is made to fuel assemblies. Such as assembly, in more detail, comprises the fuel assembly support structure formed by interspaced top and bottom grid-like end pieces between which a bundle of closely laterally interspaced fuel rods is vertically mounted, spacers being vertically interspaced fuel rods is vertically mounted, spacers being vertically interspaced along the bundle to hold the fuel rods. The spacers may be made egg-crate fashion with the fuel rods extending through the spacer openings. The fuel assembly is an integrated unit and is normally handled as such. If detected, a defective fuel rod can be removed and replaced by a good fuel rod, by equipment provided at the fuel storage pit.

What is claimed is:

1. A method for detecting defective fuel rods while in a fuel assembly removed from a water-cooled reactor and under water, said assembly containing a bundle of closely interspaced fuel rods having end portions with end caps accessible under the water; said method comprising heating said end portions via their outsides to apply heat to their insides, and via the outsides of said end caps detecting possible water inside of said fuel rods by measuring a power transmitted through said end caps and which is responsive to the action of said heat on the contents of said insides.

2. The method of claim 1 in which said power is ultrasonic acoustical power.

3. The method of claim 1 in which said power is thermal power.

4. The method of claim 1 in which said power is thermal power and said end caps are cooled by powered means and said detecting is by measuring the power required by said means to hold said end caps at a constant temperature.

5. The method of claim 1 in which said power is thermal power and said heating is by measurable power and said detecting is by measuring the amount of this power required to hold the fuel rods' said end portions at a constant temperature.

6. Equipment for detecting defective fuel rods in a bundle of fuel rods of a fuel assembly removed from a water-cooled reactor and under water, said fuel rods having upper end portions with end caps accessible under the water; said equipment comprising a tubular assembly dimensioned to be slid over any one of said upper end portions of the fuel rods without interference by adjacent fuel rods of said bundle, said assembly having a lower portion including an electric induction coil for heating the upper end portion of any one of said fuel rods over which the assembly is slid, and said assembly having an upper portion having a detector positioned to contact the end cap of that upper end portion of the fuel rod over which the assembly is slid.

7. The equipment of claim 6 in which said detector is an ultrasonic head.

8. The equipment of claim 6 in which said detector is temperature-responsive.

* * * * *

UNITED STATES PATENT AND TRADEMARK OFFICE
CERTIFICATE OF CORRECTION

PATENT NO. : 3 945 245
DATED : March 23, 1976
INVENTOR(S) : Heinz Stehle et al

It is certified that error appears in the above–identified patent and that said Letters Patent are hereby corrected as shown below:

In Column 3, line 7, after "pit" add --1--

Signed and Sealed this eighth Day of June 1976

[SEAL]

Attest:

RUTH C. MASON
*Attesting Officer*

C. MARSHALL DANN
*Commissioner of Patents and Trademarks*